(12) United States Patent
de Voogd

(10) Patent No.: US 9,547,626 B2
(45) Date of Patent: Jan. 17, 2017

(54) SYSTEMS, METHODS, AND MEDIA FOR MANAGING AMBIENT ADAPTABILITY OF WEB APPLICATIONS AND WEB SERVICES

(75) Inventor: Erik de Voogd, Moordrecht (NL)

(73) Assignee: SDL plc, Maidenhead (GB)

( * ) Notice: Subject to any disclaimer, the term of this patent is extended or adjusted under 35 U.S.C. 154(b) by 91 days.

(21) Appl. No.: 13/016,988

(22) Filed: Jan. 29, 2011

(65) Prior Publication Data

US 2012/0197957 A1 Aug. 2, 2012

(51) Int. Cl.
| | | |
|---|---|---|
| G06F 15/16 | (2006.01) | |
| G06F 17/21 | (2006.01) | |
| G06F 17/30 | (2006.01) | |
| G06F 17/22 | (2006.01) | |

(52) U.S. Cl.
CPC ......... *G06F 17/211* (2013.01); *G06F 17/2247* (2013.01); *G06F 17/30893* (2013.01); *G06F 17/30905* (2013.01)

(58) Field of Classification Search
CPC ............... G06F 17/211; G06F 17/2247; G06F 17/30893; G06F 17/30905
USPC ........................................ 709/201, 223, 224
See application file for complete search history.

(56) References Cited

U.S. PATENT DOCUMENTS

| | | | |
|---|---|---|---|
| 5,075,850 A | 12/1991 | Asahioka et al. | |
| 5,295,068 A | 3/1994 | Nishino et al. | |
| 5,477,451 A | 12/1995 | Brown et al. | |
| 5,497,319 A | 3/1996 | Chong et al. | |
| 5,644,775 A | 7/1997 | Thompson et al. | |
| 5,675,802 A | 10/1997 | Allen et al. | |
| 5,751,957 A | 5/1998 | Hiroya et al. | |
| 5,774,868 A | 6/1998 | Cragun et al. | |
| 5,813,007 A | 9/1998 | Nielsen | |
| 5,884,097 A | 3/1999 | Li et al. | |
| 5,884,246 A | 3/1999 | Boucher et al. | |
| 5,894,554 A | 4/1999 | Lowery et al. | |
| 5,895,446 A | 4/1999 | Takeda et al. | |
| 5,966,685 A | 10/1999 | Flanagan et al. | |
| 5,978,828 A | 11/1999 | Greer et al. | |
| 5,987,401 A | 11/1999 | Trudeau | |
| 5,987,402 A | 11/1999 | Murata et al. | |
| 6,026,413 A | 2/2000 | Challenger et al. | |

(Continued)

FOREIGN PATENT DOCUMENTS

| | | |
|---|---|---|
| EP | 1170680 | 1/2002 |
| EP | 2668599 | 12/2013 |

(Continued)

OTHER PUBLICATIONS

"The GNU Make Manual", Version 3.79, edition 0.55, Apr. 2000, Free Software Foundation, Inc.

(Continued)

*Primary Examiner* — Tonia L Dollinger
*Assistant Examiner* — Davoud Zand
(74) *Attorney, Agent, or Firm* — Carr & Ferrell LLP

(57) ABSTRACT

Systems, methods, and media for managing web content. Methods may include the steps of providing web content associable with a web server, evaluating ambient data received from the web server and ambient data from at least one third party source, storing the ambient data in a database, selectively modifying content included in the web content based upon the ambient data, and providing the modified web content to the web server.

22 Claims, 5 Drawing Sheets

(56) References Cited

U.S. PATENT DOCUMENTS

| | | | |
|---|---|---|---|
| 6,041,333 A | 3/2000 | Bretschneider et al. |
| 6,041,360 A | 3/2000 | Himmel et al. |
| 6,092,035 A | 7/2000 | Kurachi et al. |
| 6,108,703 A | 8/2000 | Leighton et al. |
| 6,122,666 A | 9/2000 | Beurket et al. |
| 6,128,652 A | 10/2000 | Toh et al. |
| 6,128,655 A | 10/2000 | Fields et al. |
| 6,161,082 A | 12/2000 | Goldberg et al. |
| 6,163,785 A | 12/2000 | Carbonell et al. |
| 6,216,212 B1 | 4/2001 | Challenger et al. |
| 6,219,818 B1 | 4/2001 | Freivald et al. |
| 6,256,712 B1 | 7/2001 | Challenger et al. |
| 6,263,332 B1 | 7/2001 | Nasr et al. |
| 6,278,969 B1 | 8/2001 | King et al. |
| 6,330,566 B1 | 12/2001 | Durham |
| 6,338,033 B1 | 1/2002 | Bourbonnais et al. |
| 6,347,316 B1 | 2/2002 | Redpath |
| 6,356,903 B1 | 3/2002 | Baxter et al. |
| 6,363,337 B1 | 3/2002 | Amith |
| 6,401,105 B1 | 6/2002 | Carlin et al. |
| 6,438,540 B2 | 8/2002 | Nasr et al. |
| 6,477,575 B1 | 11/2002 | Koeppel et al. |
| 6,526,426 B1 | 2/2003 | Lakritz |
| 6,581,061 B2 | 6/2003 | Graham |
| 6,623,529 B1 | 9/2003 | Lakritz |
| 6,725,333 B1 | 4/2004 | Degenaro et al. |
| 6,748,569 B1 | 6/2004 | Brooke et al. |
| 6,782,384 B2 | 8/2004 | Sloan et al. |
| 6,973,656 B1 | 12/2005 | Huynh et al. |
| 7,111,229 B2 | 9/2006 | Nicholas et al. |
| 7,249,314 B2 | 7/2007 | Walker et al. |
| 7,383,320 B1 | 6/2008 | Silberstein et al. |
| 7,606,814 B2 * | 10/2009 | Deily et al. |
| 7,698,126 B2 | 4/2010 | Kohlmeier et al. |
| 7,904,595 B2 | 3/2011 | Cheng et al. |
| 7,949,633 B1 | 5/2011 | Shaver et al. |
| 7,958,453 B1 | 6/2011 | Taing |
| 8,015,222 B2 | 9/2011 | Abnous et al. |
| 8,185,830 B2 | 5/2012 | Saha et al. |
| 8,260,846 B2 * | 9/2012 | Lahav ............... G06Q 30/02 705/14.4 |
| 8,296,463 B2 | 10/2012 | Cheng et al. |
| 8,413,045 B2 | 4/2013 | Lemonik et al. |
| 8,453,052 B1 | 5/2013 | Newman et al. |
| 8,799,200 B2 * | 8/2014 | Lahav ............... G06Q 30/02 705/14.49 |
| 8,909,683 B1 | 12/2014 | Ledet |
| 8,954,539 B2 * | 2/2015 | Lahav ............... G06Q 30/02 705/14.41 |
| 9,336,487 B2 * | 5/2016 | Lahav ............... G06Q 30/02 |
| 9,396,436 B2 * | 7/2016 | Lahav ............... G06Q 30/02 |
| 9,430,449 B2 | 8/2016 | Leblond et al. |
| 2001/0029507 A1 | 10/2001 | Nojima |
| 2002/0007383 A1 | 1/2002 | Yoden et al. |
| 2002/0023101 A1 | 2/2002 | Kurihara et al. |
| 2002/0065848 A1 | 5/2002 | Walker et al. |
| 2002/0103698 A1 | 8/2002 | Cantrell |
| 2002/0112013 A1 | 8/2002 | Walsh |
| 2002/0120762 A1 | 8/2002 | Cheng et al. |
| 2002/0178166 A1 | 11/2002 | Hsia |
| 2003/0023757 A1 | 1/2003 | Ishioka et al. |
| 2003/0163346 A1 | 8/2003 | Tinti et al. |
| 2004/0010496 A1 | 1/2004 | Behrendt et al. |
| 2004/0019849 A1 | 1/2004 | Weng et al. |
| 2004/0044576 A1 | 3/2004 | Kurihara et al. |
| 2004/0148409 A1 | 7/2004 | Davis et al. |
| 2004/0187090 A1 | 9/2004 | Meacham |
| 2005/0039116 A1 | 2/2005 | Slack-Smith |
| 2005/0086105 A1 | 4/2005 | McFadden et al. |
| 2005/0228865 A1 | 10/2005 | Hirsch |
| 2005/0246283 A1 | 11/2005 | Gwiazda et al. |
| 2006/0053367 A1 | 3/2006 | Chen et al. |
| 2006/0080397 A1 | 4/2006 | Chene et al. |
| 2006/0178918 A1 | 8/2006 | Mikurak |
| 2006/0248442 A1 | 11/2006 | Rosenstein et al. |
| 2007/0016363 A1 | 1/2007 | Huang et al. |
| 2007/0033104 A1 | 2/2007 | Collins et al. |
| 2007/0047781 A1 | 3/2007 | Hull et al. |
| 2007/0048714 A1 | 3/2007 | Plastina et al. |
| 2007/0083425 A1 | 4/2007 | Cousineau et al. |
| 2007/0118545 A1 | 5/2007 | Chandrasekharan et al. |
| 2007/0208991 A1 | 9/2007 | Rider |
| 2007/0209005 A1 | 9/2007 | Shaver et al. |
| 2007/0226058 A1 | 9/2007 | Lorenzen et al. |
| 2007/0234213 A1 | 10/2007 | Krikorian et al. |
| 2008/0195664 A1 | 8/2008 | Maharajh et al. |
| 2008/0209320 A1 | 8/2008 | Mawhinney et al. |
| 2008/0244053 A1 | 10/2008 | Sampson et al. |
| 2008/0316228 A1 | 12/2008 | Seljavaara |
| 2009/0061764 A1 | 3/2009 | Lockhart et al. |
| 2009/0099931 A1 | 4/2009 | Aaltonen et al. |
| 2009/0197580 A1 | 8/2009 | Gupta et al. |
| 2009/0217352 A1 | 8/2009 | Shen et al. |
| 2009/0248801 A1 | 10/2009 | Then et al. |
| 2009/0259684 A1 | 10/2009 | Knight et al. |
| 2009/0313245 A1 | 12/2009 | Weyl et al. |
| 2010/0023475 A1 * | 1/2010 | Lahav ............... G06Q 30/02 706/59 |
| 2010/0023581 A1 * | 1/2010 | Lahav ............... G06Q 30/02 709/203 |
| 2010/0070364 A1 | 3/2010 | Dugan |
| 2010/0070843 A1 | 3/2010 | Duym |
| 2010/0211865 A1 | 8/2010 | Fanning et al. |
| 2010/0233996 A1 * | 9/2010 | Herz et al. ............... 455/411 |
| 2010/0242069 A1 | 9/2010 | Jung et al. |
| 2010/0257457 A1 | 10/2010 | De Goes |
| 2010/0274661 A1 | 10/2010 | Aaltonen et al. |
| 2010/0281008 A1 | 11/2010 | Braunwarth |
| 2010/0312619 A1 | 12/2010 | Ala-Pietila et al. |
| 2011/0047468 A1 | 2/2011 | Ishizaka |
| 2011/0078626 A1 | 3/2011 | Bachman et al. |
| 2011/0191458 A1 | 8/2011 | Cheng et al. |
| 2011/0264736 A1 * | 10/2011 | Zuckerberg et al. ......... 709/204 |
| 2011/0270975 A1 | 11/2011 | Troup |
| 2012/0023129 A1 | 1/2012 | Vedula et al. |
| 2012/0096366 A1 * | 4/2012 | Narla et al. ............... 715/744 |
| 2012/0131441 A1 | 5/2012 | Jitkoff et al. |
| 2012/0136718 A1 | 5/2012 | Katti |
| 2012/0143816 A1 | 6/2012 | Zhang et al. |
| 2012/0185759 A1 | 7/2012 | Balinsky et al. |
| 2012/0197718 A1 | 8/2012 | Martchenko et al. |
| 2012/0197770 A1 | 8/2012 | Raheja et al. |
| 2012/0221407 A1 | 8/2012 | Erasmus et al. |
| 2013/0031470 A1 | 1/2013 | Daly, Jr. et al. |
| 2013/0036202 A1 * | 2/2013 | Lahav ............... G06Q 30/02 709/219 |
| 2013/0067055 A1 | 3/2013 | Cheng et al. |
| 2013/0097488 A1 | 4/2013 | Coman et al. |
| 2013/0144566 A1 | 6/2013 | De Biswas |
| 2013/0151940 A1 | 6/2013 | Bailor et al. |
| 2013/0262986 A1 | 10/2013 | Leblond et al. |
| 2013/0304607 A1 | 11/2013 | Costa et al. |
| 2014/0019625 A1 | 1/2014 | Cheng et al. |
| 2014/0081775 A1 | 3/2014 | Leblond et al. |
| 2014/0082032 A1 | 3/2014 | Leblond et al. |
| 2014/0181013 A1 | 6/2014 | Micucci et al. |
| 2014/0250369 A1 | 9/2014 | Mitnick et al. |
| 2014/0310229 A1 * | 10/2014 | Lahav ............... G06Q 30/02 706/52 |
| 2015/0040000 A1 | 2/2015 | Rice et al. |
| 2015/0149885 A1 | 5/2015 | Homer et al. |
| 2015/0149886 A1 | 5/2015 | Homer et al. |
| 2015/0213363 A1 * | 7/2015 | Lahav ............... G06Q 30/02 706/11 |

FOREIGN PATENT DOCUMENTS

| | | |
|---|---|---|
| EP | 2668626 | 12/2013 |
| EP | 2678814 | 1/2014 |
| EP | 2896007 | 7/2015 |
| EP | 2896008 | 7/2015 |
| JP | 2001117847 A | 4/2001 |
| JP | 2001136583 A | 5/2001 |

(56) References Cited

FOREIGN PATENT DOCUMENTS

| | | |
|---|---|---|
| JP | 2001188992 A | 7/2001 |
| JP | 2001350790 A | 12/2001 |
| JP | 2002073677 A | 3/2002 |
| JP | 2002132822 A | 5/2002 |
| JP | 2003032660 A | 7/2003 |
| JP | 2004538542 A | 12/2004 |
| JP | 2005056080 A | 3/2005 |
| JP | 2005174120 A | 6/2005 |
| JP | 2005267535 A | 9/2005 |
| JP | 2006260329 A | 9/2006 |
| JP | 2008027265 A | 2/2008 |
| JP | 2009518761 A | 5/2008 |
| JP | 2009020845 A | 1/2009 |
| JP | 2009301480 A | 12/2009 |
| JP | 2010152588 A | 7/2010 |
| JP | 2011002905 A | 1/2011 |
| JP | 5952307 B2 | 7/2016 |
| JP | 5952312 B2 | 7/2016 |
| WO | WO03081441 | 2/2003 |
| WO | WO2012101240 | 8/2012 |
| WO | WO2012101243 | 8/2012 |
| WO | WO2012113791 | 8/2012 |
| WO | WO2013144358 | 10/2013 |
| WO | WO2013167734 | 11/2013 |
| WO | WO2014041148 | 3/2014 |
| WO | WO2014041149 | 3/2014 |

OTHER PUBLICATIONS

Rational Software Corporation, "Introduction to ClearCase", Dec. 1999, Rational ClearCase, Release 4.0.
Rational Software Corporation, "Administering ClearCase", Rational ClearCase Release 4.0, 1999.
Challenger et al., "A Scalable System for Consistently Caching Dynamic Web Data", INFOCOM '99. Eighteenth Annual Joint Conference of the IEEE Computer and Communications Societies. Proceedings. IEEE, Mar. 21-25, 1999, pp. 294-303, vol. 1.
Challenger et al., "A Publishing System for Efficiently Creating Dynamic Web Content", INFOCOM 2000. Nineteenth Annual Joint Conference of the IEEE Computer and Communications Societies. Proceedings. IEEE, Mar. 26-30, 2000, vol. 2.
Croll et al., "Content Management—The Users Requirements", International Broadcasting Convention, Conference Publication No. 447, Sep. 12-16, 1997.
IDIOM, Inc. "WorldServer 2 White Paper", 2000, 19 pages.
Market Wire. "VerticalNet Selects Uniscape as Globalization Provider to Speed Global Expansion", Jun. 2000, <www.findarticles.com/p/articles/mi_pwwi/is_200006/ai_mark01011558/print> accessed on Oct. 1, 2005, 2 pages.
PRNewsWire and NEWSdesk. "Personify Selects Uniscape to Enable Ebusiness Solutions for Global Markets", Aug. 30, 2000, <www.findwealth.com/personify-selects-uniscape-to-enable-180593pr.html> accessed on Oct. 1, 2005, 2 pages.
Uniscape, Inc. "Uniscape, Inc. Home Page", publicly posted Feb. 20, 1999, <web.archive.org/web/19990220195249//http://www.uniscape-inc.com/> accessed on Oct. 1, 2005, 2 pages.
Business Wire. "Uniscape Introduces Pilot Program to Provide Multilingual Website Management Solutions," Feb. 11, 1999, <www.findarticles.com/p/articles/mi_m0EIN/is_1999_Feb_11/11/ai_53852378> accessed on May 9, 2011, 1 page.
Business Wire. "Uniscape Announces New Solution for Automating Management of Software Localization Process," Aug. 17, 1998, <www.findarticles.com/p/articles/mi_m0EIN/is_1998_August_17/ai_21090247> accessed on Oct. 1, 2005, 2 pages.
Market Wire. "Cephren Relies on Uniscape During Rapid Global eBusiness Expansion," Oct. 18, 2000, <www.marketwire.com/mw/iwpr?id=18115&cat=te> accessed on Oct. 1, 2005, 2 pages.
My Yahoo—RSS Headlines Module—"Frequently Asked Questions," Jan. 24, 2004, <http://web.archive.org/web/20040124175747/http://my.yahoo.com/s/rss-f aq. html> accessed on Dec. 17, 2008, 4 pages.
Krishnan, "Unmittelbare Ergenbnisse Noch Schneller: Google Vorschau—Der Google Produkt-Kompass," Nov. 9, 2010, <http://web.archive.org/web/20101109154340/http://google-produkt-kompass.blogspot.com/2010/11/unmittelbare-ergebnisse-nochschneller.html> accessed on Apr. 4, 2012, 2 pages.
Unidex, Inc.: "XML Convert," Aug. 4, 2007, <http://www.unidex.com/xflat.htm> accessed on Apr. 5, 2012, 1 page.
Wikipedia—"SOAP," Jan. 22, 2011, <http://en.wikipedia.org/w/index.php?title=SOAP&oldid=409349976> accessed on Apr. 4, 2012, 5 pages.
Mutz et al., "User-Agent Display Attributes," HTTP Working Group, Nov. 26, 1996, 6 pages.
Non-Final, Jan. 17, 2011, U.S. Appl. No. 13/016,989, filed Jan. 29, 2011.
Non-Final, May 23, 2013, U.S. Appl. No. 13/035,852, filed Feb. 25, 2011.
Allowance, Jun. 13, 2012, U.S. Appl. No. 13/019,980, filed Feb. 2, 2011.
International Search Report and Written Opinion mailed Apr. 26, 2012 in application No. PCT/EP2012/051284, filed Jan. 27, 2012.
International Search Report and Written Opinion mailed May 15, 2012 in application No. PCT/EP2012/052934, filed Feb. 21, 2012.
International Search Report and Written Opinion mailed May 2, 2012 in application No. PCT/EP2012/051291, filed Jan. 27, 2012.
International Search Report and Written Opinion Mailed Oct. 23, 2013 in Patent Cooperation Treaty application No. PCT/EP2013/056842, filed Mar. 29, 2013 pp. 1, 3-6, 8-10.
International Search Report and Written Opinion Mailed Jan. 8, 2014 in Patent Cooperation Treaty application No. PCT/EP2013/069078, filed Sep. 14, 2013 pp. 1, 3-7.
International Search Report and Written Opinion Mailed Jan. 8, 2014 in Patent Cooperation Treaty application No. PCT/EP2013/069077, filed Sep. 14, 2013 pp. 1, 3, 4, 6-8.
Colligan et al.; Special Edition Using Microsoft Office FrontPage 2003; 2004; Que Publishing; pp. 50-91 and 323-326.
"Highlight;" Microsoft Computer Dictionary; May 1, 2002; Microsoft Press; p. 320.
First Examination Report mailed Jun. 17, 2014 in European Patent Convention application No. 12707723.8, filed Feb. 21, 2012, pp. 1, 3-6.
Non-Final Office Action, Nov. 19, 2013, U.S. Appl. No. 13/016,989, filed Jan. 29, 2011.
Final Office Action, Jul. 1, 2014, U.S. Appl. No. 13/016,989, filed Jan. 29, 2011.
Final Office Action, Feb. 3, 2014, U.S. Appl. No. 13/035,852, filed Feb. 25, 2011.
Advisory Action, Apr. 16, 2014, U.S. Appl. No. 13/035,852, filed Feb. 25, 2011.
Non-Final Office Action, May 9, 2014, U.S. Appl. No. 13/436,656, filed Mar. 30, 2012.
Final Office Action, Dec. 4, 2014, U.S. Appl. No. 13/436,656, filed Mar. 30, 2012.
Non-Final Office Action, May 6, 2014, U.S. Appl. No. 13/609,293, filed Sep. 11, 2012.
Summons to Attend Oral Proceedings mailed Feb. 11, 2015 in European Patent Convention application No. 1270772.8, filed Feb. 21, 2012.
"Inheritance (object-oriented programming)", archived Wikipedia on Sep. 4, 2011, http://en.wikipedia.org/w/index.php?title=Inheritance_(object-oriented_programming)&oldid=448382925.
Result of Consultation mailed May 28, 2015 in European Patent Convention application No. 12707723.8, filed Feb. 21, 2012.
The Minutes of Oral Proceeding mailed Jun. 29, 2015 in European Patent Application 12707723.8 filed Feb. 21, 2012.
Decision to Refuse mailed Jun. 29, 2015 in European Patent Application 12707723.8 filed Feb. 21, 2012.
Final Office Action, Sep. 23, 2015, U.S. Appl. No. 13/016,989, filed Jan. 29, 2011.
Advisory Action, Feb. 9, 2016, U.S. Appl. No. 13/016,989, filed Jan. 29, 2011.
Final Office Action, Jan. 7, 2016, U.S. Appl. No. 13/436,656, filed Mar. 30, 2012.

(56) References Cited

OTHER PUBLICATIONS

Non-Final Office Action, Dec. 14, 2015, U.S. Appl. No. 13/886,194, filed May 2, 2013.
Final Office Action, Jan. 19, 2016, U.S. Appl. No. 13/886,199, filed May 2, 2013.
Non-Final Office Action, Sep. 29, 2015, U.S. Appl. No. 14/023,384, filed Sep. 10, 2013.
Non-Final Office Action, Oct. 30, 2015, U.S. Appl. No. 14/091,329, filed Nov. 26, 2013.
Non-Final Office Action, Mar. 10, 2016, U.S. Appl. No. 13/035,852, filed Feb. 25, 2011.
Advisory Action, Mar. 8, 2016, U.S. Appl. No. 13/436,656, filed Mar. 30, 2012.
Notice of Allowance, May 4, 2016, U.S. Appl. No. 13/436,656, filed Mar. 30, 2012.
Non-Final Office Action, May 3, 2016, U.S. Appl. No. 13/609,293, filed Sep. 11, 2012.
Final Office Action, May 3, 2016, U.S. Appl. No. 14/023,384, filed Sep. 10, 2013.
Non-Final Office Action, Mar. 2, 2015, U.S. Appl. No. 13/016,989, filed Jan. 29, 2011.
Non-Final Office Action, Jun. 8, 2015, U.S. Appl. No. 13/436,656, filed Mar. 30, 2012.
Final Office Action, Mar. 18, 2015, U.S. Appl. No. 13/609,293, filed Sep. 11, 2012.
Advisory Action, Jun. 29, 2015, U.S. Appl. No. 13/609,293, filed Sep. 11, 2012.
Non-Final Office Action, Feb. 26, 2015, U.S. Appl. No. 13/886,194, filed May 2, 2013.
Non-Final Office Action, May 19, 2015, U.S. Appl. No. 13/886,199, filed May 2, 2013.
Preview; Feb. 26, 2011; Dictionary.com; pp. 1-2.
Edgar; "Why Do Browsers Display My Site Differently?" Jun. 3, 2009 (updated Nov. 2010); matthewedgar.net; pp. 1-5.
Office Action mailed Jan. 5, 2016 in Japanese Patent Application 2013-550887 filed Jul. 26, 2013.
Office Action mailed Dec. 22, 2015 in Japanese Patent Application 2013-550888 filed Jan. 27, 2012.
Office Action mailed Feb. 9, 2016 in Japanese Patent Application 2016-554869 filed Feb. 21, 2012.
Notice of Allowance mailed May 24, 2016 in Japanese Patent Application 2013-550888 filed Jan. 27, 2012, pp. 1-3.
Notice of Allowance mailed May 24, 2016 in Japanese Patent Application 2013-554869 filed Feb. 21, 2012, pp. 1-3.
XP007905525, The Technical Aspects Identified in the Present Application (Art. 15 PCT) are considered part of common general knowledge. Due to their notoriety no. documentary evidence is found to be required. Official Journal Nov. 2007, p. 592.
Japan Patent Application No. 2013-550887, "Office Action," Oct. 4, 2016, 4 pages [8 pages including translation].
European Patent Application No. 12703482.5, "Office Action," Sep. 6, 2016, 4 pages.

\* cited by examiner

SYSTEMS, METHODS, AND MEDIA FOR MANAGING AMBIENT ADAPTABILITY OF WEB APPLICATIONS AND WEB SERVICES

This nonprovisional patent application is related to U.S. patent application Ser. No. 13/016,989 filed on Jan. 29, 2011, titled "SYSTEMS, METHODS, AND MEDIA FOR WEB CONTENT MANAGEMENT," which is hereby incorporated herein by reference in its entirety including all references cited therein.

FIELD OF THE INVENTION

The present invention relates generally to web content management, and more specifically, but not by way of limitation, to systems, methods, and media for managing web content.

SUMMARY OF THE INVENTION

According to some embodiments, the present invention is directed to methods for managing web content that include the steps of (a) providing web content associable with a web server; (b) evaluating ambient data received from the web server and ambient data from at least one third party source; (c) storing the ambient data in a database; (d) selectively modifying content included in the web content based upon the ambient data; and (e) providing the modified web content to the web server.

According to other embodiments, the present invention may be directed to systems for managing web content that includes (a) a memory for storing a web content management application that includes computer-readable instructions comprising: (1) a content manager module adapted to: (i) maintain a global marketing framework indicative of a marketing campaign; and (ii) generate web content from at least a portion of the global marketing framework, the web content adapted to be hosted on a web server; and (2) an ambient data framework adapted to: (i) evaluating ambient data received from the web server and ambient data from at least one third party source; (ii) store the ambient data in a database; and (iii) selectively modify content included in the web content based upon the ambient data; and (3) the content manager module being adapted to provide the web content having modified content to the web server, and (b) a processor adapted to execute the web content management application.

According to some embodiments, the present invention may be directed to non-transitory computer readable storage medium having a computer program embodied thereon, the computer program executable by a processor in a computing system to perform a method for managing web content that includes (a) providing web content associable with a web server; (b) evaluating ambient data received from the web server and ambient data from at least one third party source; (c) storing the ambient data in a database; (d) selectively modifying content included in the web content based upon the ambient data; and (e) providing the modified web content to the web server.

DETAILED DESCRIPTION OF EXEMPLARY EMBODIMENTS

Figure 1A:
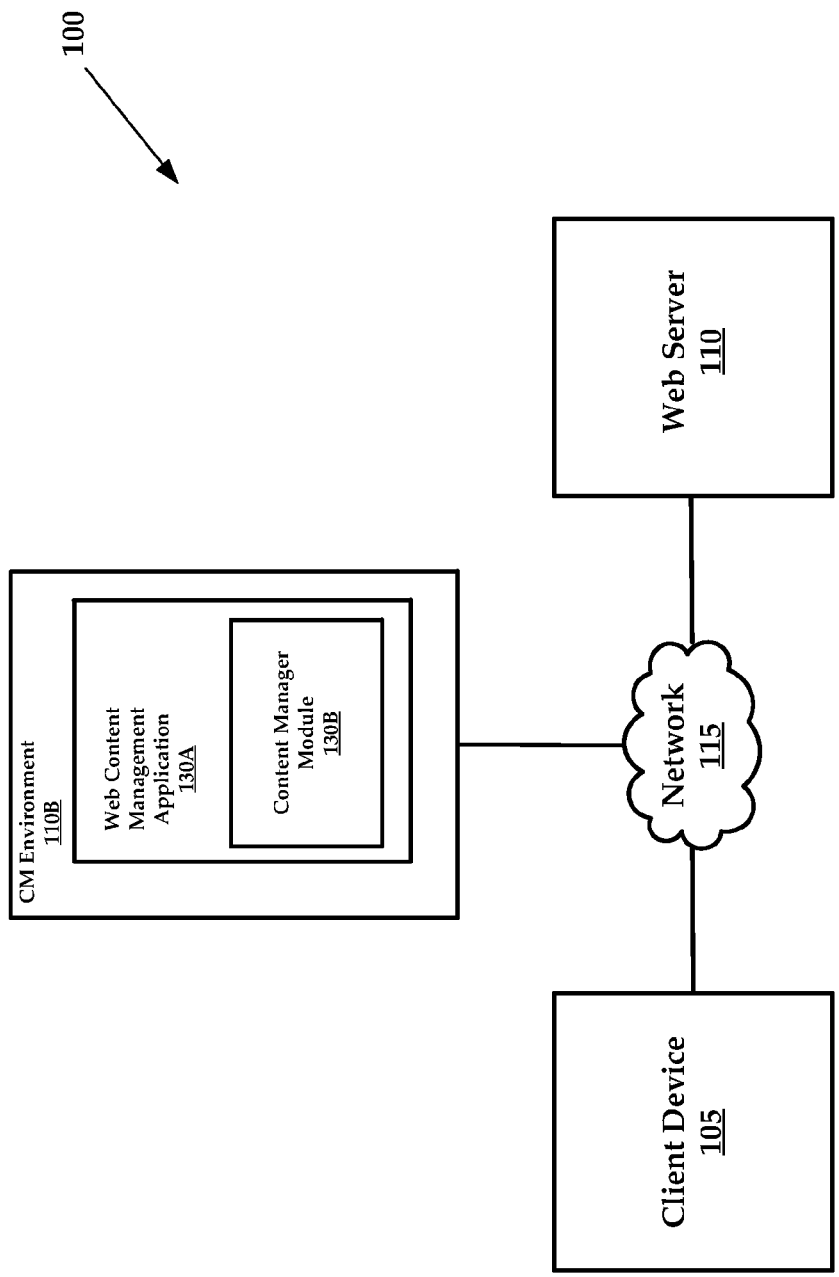
FIG. 1A is a schematic diagram of an exemplary architecture of a system for managing web content, the system may be utilized to practice aspects of the present invention.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Generally speaking, the systems and methods provided herein may be adapted to gather ambient data indicative of the preferences of end users accessing web content, such as web pages. The systems and methods may also gather ambient data from third party content sources and modify the web content based upon the visitor information. Therefore, the content of the web content may be tailored to the preferences of the end users.

Referring to FIG. 1A, a schematic diagram of an exemplary architecture 100 for practicing aspects of the present invention is depicted. Generally speaking, the architecture may include a client system 105 (or a plurality of client systems), also referred to herein as client device 105, that are communicatively coupled with a web server 110 via a network 115. The network 115 may include any one of a number of different communication channels, and in some embodiments may include the Internet.

The client system 105 may include any general purpose computing system that may implement a web browser application or other suitable applications adapted to request and provide information (such as web content) to and from a web server 110. A suitable client system 105 may include the computing system 300 disclosed with reference to FIG. 3.

When a visitor requests a web content (web page having one or more interactive content such as a banner, link, etc.) via the web browser associated with their client device 105, the client device 105 transmits the request to the web server 110 via the network 115.

According to some embodiments, before the web server 110 provides the web content to the client device, an ambient data framework 120 associated with a content management (CM) system 110B, also referred to herein as CM Environment 110B, may customize the content of the web content to correspond to the preferences of the visitor, before the web server 110 provides the web content to the client device 105. The CM environment 110B may include an number of computing systems such as client devices, servers, applications, and the like, that incorporate a web content management application and other associated applications for creating web content.

As stated above, web content may include a web page that incorporates a plurality of advertisements. In other embodiments, the web page may itself be the advertisement. A web page may include advertisements in the form of interactive content such as banners, hyperlinks, and the like, that are added to the web page. Interactive content may direct visitors to an advertising portal or "landing page" associated with a provider. For the sake of brevity, web pages that include both interactive and non-interactive content, along with any landing pages associated therewith may hereinafter be referred to as the "web content." Additionally, the term "provider" may be understood to include any individual or entity associated with an advertisement.

According to some embodiments, the ambient data framework 120 may be associated with a web content management application 130A. In some embodiments, the web content management application 130A may generally include a content manager module 130B adapted to maintain a global marketing framework (not shown) indicative of a marketing campaign and generate web content (also not shown) from at least a portion of the global marketing framework via the web server 110.

The web server 110 hosting the web content may be adapted to determine ambient data by analyzing visitor behavior utilizing one or more types of web analytics. It will be understood that the terms "ambient data" may be understood to include a wide spectrum of data. Generally speaking, ambient data may encompass specific data indicative of a visitor, generic data such as ephemeral data that allow the ambient data framework 120 to characterize the conditions under which the data is collected, and data indicative of the web application hosting environment. Non-limiting examples of ambient data may include web analytics determined by a web server, specific transaction data from a visitor relationship management (CRM) system, a social networking profile or social networking content located on a social networking platform, and combinations thereof.

Web analytics may be generally described as systems and methods for collecting, measuring, analyzing, storing, and reporting data associated with a visitor's web behavior for the purposes of determining the preferences of the visitor. The systems and methods of the present invention may utilize this information to optimize the efficiency of web content (e.g., advertisements associated with web pages). For example, the web content may be customized to correspond to the preferences of the visitor.

Generally speaking, web analytics may include functions such as click analytics, visitor lifecycle analytics, hit data indicative of the number of request for a file from the web server 110, and so forth. Web analytics may also include page view data (this can include unique views from different client devices or aggregate numbers), visit or session data indicative of multiple hits to the web page from a specific client device, or the number of times an advertisement has been displayed on a web page. Additionally, bounce rates that are indicative of a visitor requesting a web page and then exiting the web page without visiting any other associated web pages may be utilized. In some embodiments, the web server 110 may evaluate the percentage of visitors who exit the web page without clicking an advertisement along with an average amount of time that visitors spend viewing the web page. While several examples of web analytics have been disclosed, one of ordinary skill in the art will appreciate that these examples are not an exhaustive list. Therefore, additional types of web analytics that would be known to one of ordinary skill in the art with the present disclosure before them are likewise contemplated for use in accordance with the present technology.

In addition to web analytics, web browsers associated with the client device 105 may directly expose certain types of visitor specific (a.k.a. personally identifiable) information to the web server 110. For example, the web browser may provide information indicative of a visitor name, a visitor identification (client ID), an address, a postal code, a telephone number, a credit card number, a social networking profile, an Internet protocol address, a media access control (MAC) address, and combinations thereof. One of ordinary skill in the art will appreciate that many other types of personally identifiable information indicative of a visitor may likewise be utilized in accordance with the present invention.

In some embodiments, the web server 110 may be adapted to gather ambient data by examining other types of data associated with a web browser such as a cookie or "window.name" data associated with a web browser session. If the cookie includes a third-party cookie, the web browser may expose a wider range of ambient data unrelated to specific interactions between the web page and the visitor. As such, third-party cookies may include web analytics indicative of each web page the visitor has accessed.

The web browser 110 may likewise be utilized to determine ambient data via one or more additional methods. For example, the web page may include one or more web forms that are adapted to receive information from the visitor. In other embodiments, the web browser may utilize a query string embedded in a uniform resource locator (URL) associated with the web page along with hyper text transfer protocol authentication information for visitors who are required to log on to the web page for access, and combinations thereof.

Ambient data may be determined by one or more of the web analytics methods described above and then provided to a third party source utilized by the provider associated with the web page. Common third party sources may include a visitor relationship management (CRM) application.

In additional embodiments, the ambient data framework 120 may be utilized to incorporate ambient data gathered from a web browser or a client device with specific ambient data incorporated from a marketing ecosystem (not shown) associated with a particular provider (e.g., the entity associated with the web content). The term "ecosystem" will be understood to include one or more third party sources that may be accessed by the ambient data framework 120 to locate specific ambient data associated with a particular visitor requesting one or more web content.

According to some embodiments, the ambient data framework 120 may be adapted to interface with various types of third party sources that provide information of interest to the visitor such as weather related data, geolocation data, and the like. This information may be utilized by the ambient data framework 120 to selectively modify the content of the web content to include personalized weather information, or location specific event information, along with targeted advertisements based upon the previous commercial transaction data or web analytics associated with the visitor.

The ambient data framework 120 may be adapted to effectively operate on a granular level by interfacing with third party sources such as the CRM system. The ambient data framework 120 may utilize highly specific ambient data such as previous commercial transaction data from a CRM system to modify the web content before the web content is delivered to the client device 105. As such, the ambient data framework 120 may customize the web content to suit the preferences of individual visitors within their database.

Moreover, the ambient data framework 120 may operate according to varying levels of granularity. For example, the ambient data framework 120 may be adapted to modify the content of the web pages for individual visitors, or may modify the content of the web pages for groups of visitors, or an aggregate profile of an amount of visitors that request the web content.

Figure 1B:
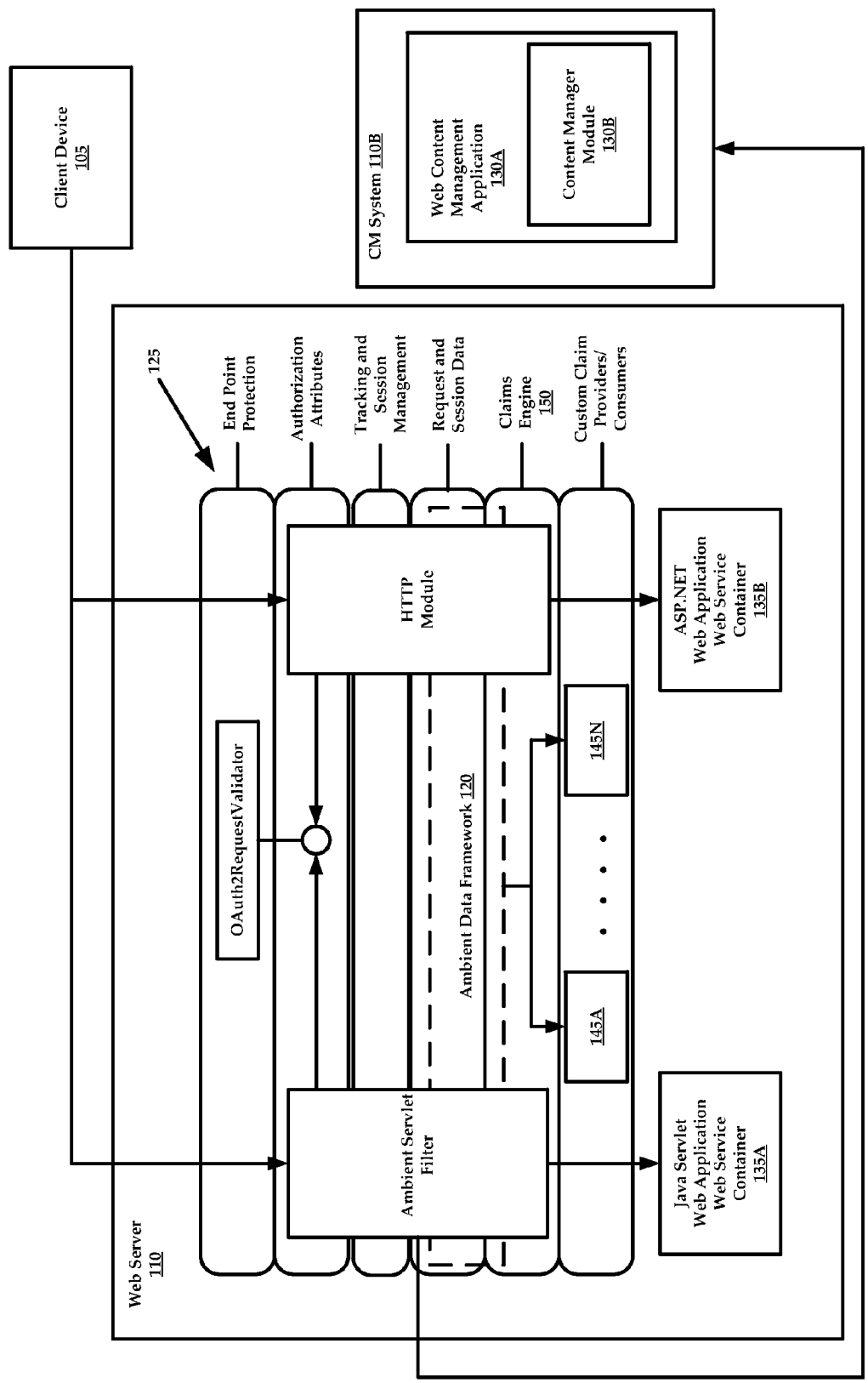
FIG. 1B illustrates a framework for implementing an ambient data framework.

Referring now to FIGS. 1A and 1B collectively, according to some embodiments, the ambient data framework 120 may be generally described as including a runtime module 125 adapted to interface the ambient data framework 120 with at least one of Java Servlet third party sources and ASP.NET (e.g., web-services enabled) third party sources, represented by web application/web services containers 135A and 135B, respectively. The web content management application may 130A may receive ambient data from the ambient data framework 120 (assembled by the runtime module 125) that may be utilized as content to generate web content. It will be understood that although the web application/containers 135A and 135B have been described as being separate container, one of ordinary skill in the art will appreciate that the data from third party data sources such as web applications, web-enabled services, and the like, may be combined into a single third party source container.

The runtime module 125 may be adapted to abstract the hosting environment of the web server 110 (e.g., containers 135A and 135B, life-cycle projection data, and security infrastructure) toward the ambient data framework 120. Moreover, the runtime module 125 may be adapted to capture an ambient data set from the request received from the client device 105. For example, ambient data may be gathered from at least one of visitor authorization attributes (e.g., username, password, etc.), request and/or session data provided by the web services/web application containers 135A and 135B, along with previous ambient data gathered from previous request(s) by the same visitor.

It will be understood that the terms "life-cycle" may include a visitor-centric approach to determining ambient data. Life-cycle analytics may join together disparate web analytics into a cohesive visitor profile that may provide marketers with the ability to optimize their web content. It is noteworthy that a life-cycle may include aggregate analytics such as page views, clicks and other events described in greater detail above. Life-cycle analytics are tied to discrete visitors instead of being stored as raw ambient data.

In some embodiments, the life-cycle data utilized by the runtime module 125 may include stages such as session start, request start, and request end. It is contemplated that the runtime module 125 may collect life-cycle data in a fashion that is agnostic to the specific web services/web application containers (e.g., 135A and 135B) being utilized by the runtime module 125. That is, the runtime module 125 may collect life-cycle data that may be utilized with web application container (e.g., 135A and 135B) that utilize a variety of data formats.

Generally speaking, the runtime module 125 may be adapted to capture ambient data that may be associated with the web request received from the web browser of the client device 105. Ambient data may be gather from web session data of the web browser or another application involved in generating a request for the web content, such as mobile agent, device, visitor, content, affiliate, and an external application—just to name a few.

The runtime module 125 may utilize one or more claims processors 140A-E (see FIG. 1C) that may enrich already captured ambient data with additional or "derived" ambient data and/or ambient data gathered from external data sources such as third party sources. The claims processors 140A-E may be adapted to expose already captured ambient data to external data sinks or drive third party sources based on captured ambient data and/or projected visitor life-cycle stage relative to the visitor interaction with the web content.

The runtime module 125 may also facilitate hyper text transfer protocols (HTTP(S)) end-point protection (i.e., extensible, with out-of-the-box (OOB) implementation based on OAuth 2.0 authorization standard), authorization attributes (i.e., extensible, with OOB implementation based on Simple Web Token), along with visitor tracking and web browser session management functionalities. While the runtime module 125 has been disclosed as utilizing OAuth 2.0 authorization, it will be understood that the runtime module 125 may include any other suitable methods or standards for authorizing data over a network connection.

Moreover, the runtime module 125 may include a claims engine 150 adapted to protect claim values generated by the claims processors 140A-E from modification. It will be understood that claim values may include ambient data such as web browser authorization attributes. Moreover, the runtime module 125 may include claim providers that utilize deterministic life-cycle projections (e.g., request start and/or end data, session start data, etc.). Additionally, the ambient data framework 120 may utilize in-context access to ambient data through Java Servlets and .NET application programming interfaces associated with third party sources, although one of ordinary skill in the art will appreciate that the ambient data framework may be adapted to receive data from additional third party sources having other data formats, server runtime configurations (e.g., PHP, RubyOnRails, and so forth), and the like. In exemplary embodiments, the Ambient Servlet Filter in FIG. 1B is for Java Servlet-based web application containers, and the HTTP Module in FIG. 1B is for ASP.NET-based web application containers. The application programming interface may be made available to one or more of the claims processors 140A-E, program libraries (not shown) hosted in the web services/web application containers 135A and 135B, or a third party web-based application or a web-service enabled third party source, via .NET functionalities.

In some embodiments, the claims processors 140A-E may function as claim providers, claim consumers, and in some applications, both. Each of the claims processors 140A-E may implement a predefined application programming interface that enables the runtime module 125 to at least one of initialize one or more of the claims processors 140A-E and invoke the initialized claims processors 140A-E to consume existing ambient data and/or provide additional types of ambient data.

The data exchange adapters 145A-N, may provide the ambient data framework 120 with an ability to package and deploy a set of claims processors selected from the claims processors 140A-E. It will be understood that the data exchange adapters 145A-N may also be referred to as "cartridges." The data exchange adapters 145A-N may contain metadata for each of the initialized claims processors 140A-E. The metadata may describe the input claims the claims processors 140A-E depend on (if any) and output claims that the claims processors 140A-E provide (if any). The inclusion of metadata may allow the ambient data framework 120 to invoke individual claims processors 140A-E in the correct order to establish a claims pipeline 155 (see FIG. 1C).

Non-limiting examples of classes of claims processors 140A-E may include claims processors that have no input dependencies, but may generate one or more output claims. For example, a claim processor may provide data such as server time and date. Other claims processors may have one or more input dependencies and one or more output claims. For example, a claim processor may receive input such as visitor identification that may be output as a name, or an e-mail address that may be retrieved from at least one third party source (e.g., email server).

Other claims processors may receive input such as one or more input claim dependencies by generate no output claims. For example, a claim processor may receive input such as visitor preferences that are stored to an external data source such as a database 107 associated with the CM environment 110B. In yet other embodiments, claims processors may receive no input claim dependencies and generate no output claims. By way of example, a claim processor may drive an external sub-system based on life-cycle data (e.g., request start, request end), such as a third party tracking sub-system.

It will be understood that the scope of a claim processor may be indicative of a lifespan within which the ambient data is valid. This provides context to how the ambient data may be handled. Therefore, determining a scope allows for optimal use of memory and processing power (i.e., if claims with session scope may be cached by the web application container being utilized). Moreover, re-evaluation of the ambient data may not be required unless the input claim dependency of the claims processors 140A-E is modified. In some embodiments, the runtime module 125 may be adapted to utilize claims processors 140A-E that may include a transitive scope (e.g., lifespan from one browser request to the next browser request).

In sum, the ambient data framework 120 may be adapted to protect HTTP(S) end-points and derive authorization attributes. The authorization attributes may pertain to a third party source (and its owner), a visitor, a content/resource owner, and combinations thereof. Additionally, the ambient data framework 120 may utilize session life-cycle (stage) projections that are agnostic to the hosting web services/web application containers 135A and 135B. In some embodiments, the ambient data framework 120 may include provisions for tracking and session management of web browsers utilized by visitors. It will be understood that tracking may be utilized to identify return visitors. In other embodiments, session identification functions allow the ambient data framework 120 to group subsequent requests that constitute a single visitor engagement (life-cycle).

Additionally, the ambient data framework 120 may be adapted to identify the origin of third party source data by utilizing multiple processing cluster and/or location scenarios. In some instances, the ambient data framework 120 may allow at least one of individuals implementing the web content, independent vendors, and independent service providers to enrich ambient data by providing additional functionality to the web content. Moreover, these added functionalities may be included in web content in the form of web applications and/or web-services enabled applications. These added functionalities may be incorporated into the web content without the need to modify the core content of the web content.

Figure 1C:
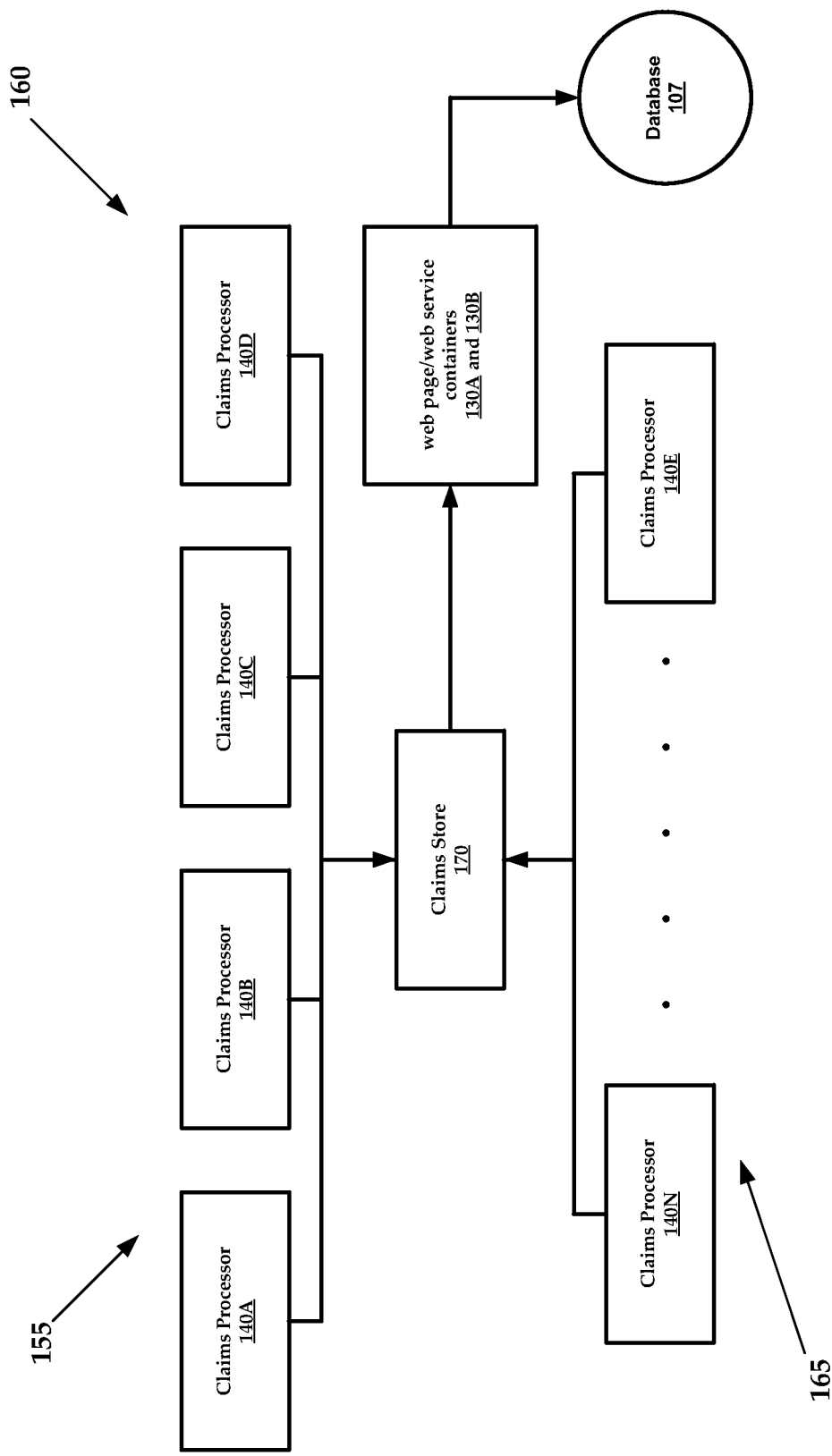
FIG. 1C illustrates a schematic diagram of a process flow associated with a runtime module of the ambient data framework.

Referring now to FIGS. 1A-1C, a process flow 160 may generally include a first claims pipeline 155, a second claims pipeline 165, and a claims store 170. As described with regard to the session life-cycle (stage) projection, for each of the three distinct stages (e.g., session start, request start, request end), the runtime module 125 may establish and invoke the process flow that includes the first claims pipeline 155 and the second claims pipeline 165. The first claims pipeline 155 may include both the "session start" pipeline that may be executed only once per detected session, before execution of the first "request start" pipeline.

On the web server 110, the processing of a web page or web service data request may be enveloped by a request start/end pipeline pair (e.g., may be preceded with a "session start" pipeline invocation before the first "request start" pipeline in a given session). Enclosed between executions of these pipelines, the actual implementation and/or handler for the web request is executed.

It will be understood that claims processors 140A-E in the "session start" or "request start" stages may be allowed to provide ambient data to the claims store 170 (by possibly invoking external data sources) and/or invoking external sub-systems (e.g., third party sources). The claims processors 140A-E in the "request end" stage are able to store ambient data in external data sources such as the database 107 associated with the CM environment 110E and/or invoke external sub-systems.

The metadata exposed by the data exchange adapters 145A-N may describe claim processor 140A-E dependencies on input claims and any known output claims that other claims processors 140A-E may depend upon. The ambient data framework 120 may inspect these inputs and outputs, as well as claim scope to determine the order in which individual claims processors 140A-E should be invoked. Claims processors 140A-E that may not dependent on input claims may be placed in the first or second pipelines 155 or 170 in an arbitrary position.

The web page/web services containers 130A and 130B (e.g., third party sources) associated with the ambient data framework 120 may include at least one of web based applications, web service logic, run-time and/or program libraries hosted in the web application containers 135A and 135B.

Figure 2:
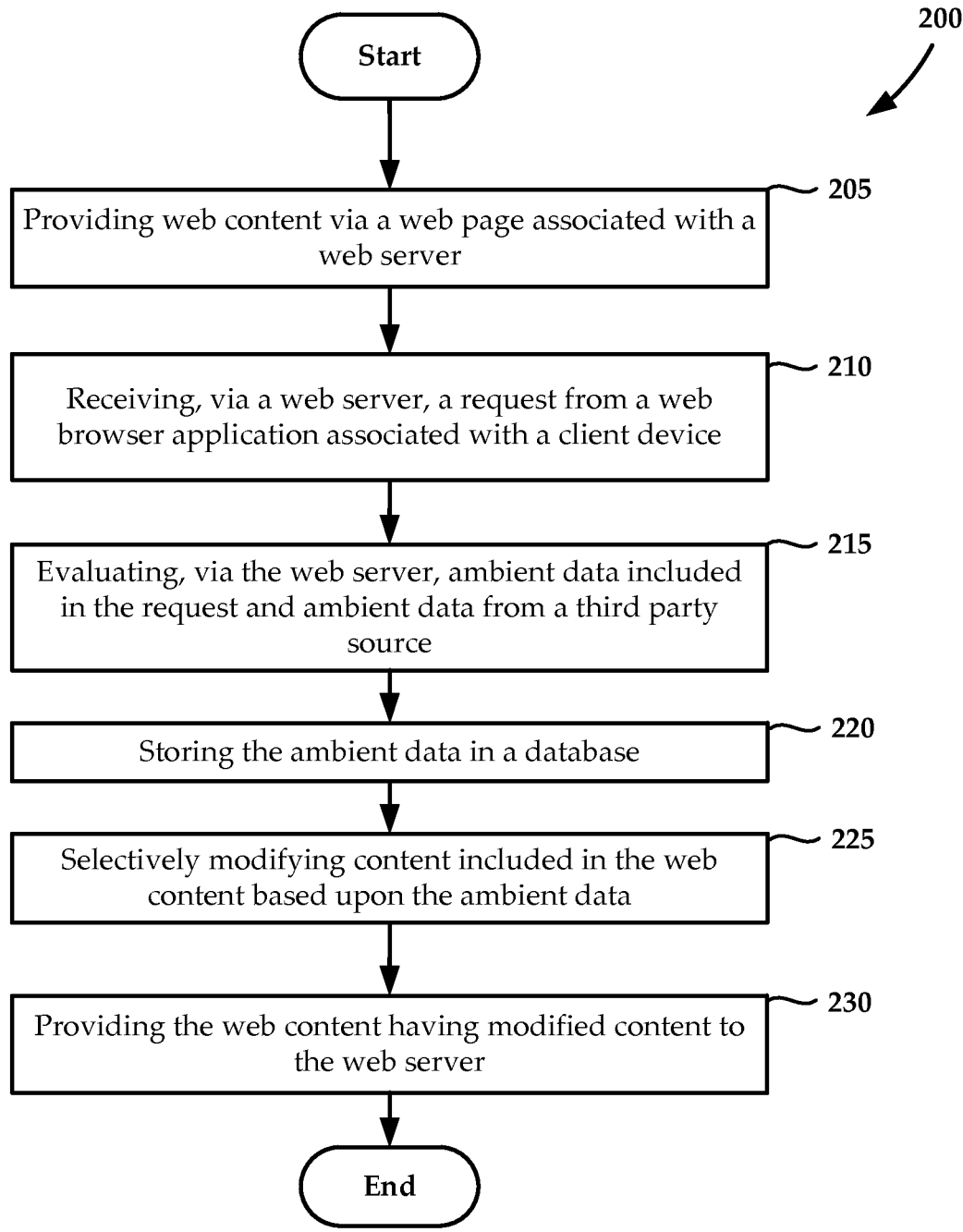
FIG. 2 is an exemplary flow chart of a method for managing web content.

FIG. 2 illustrates an exemplary flow chart 200 depicting an exemplary method for managing web content. The method 200 may include the step 205 of providing web content via a web page associated with a web server along with a step 210 of receiving, via the web server, a request from a web browser application associated with a client device.

The method 200 may include the step 215 of evaluating, via the web server, ambient data included in the request and ambient data from at least one third party source and the step 220 of storing the ambient data in a database. In other embodiments, the method 200 may include the step 225 of selectively modifying content included in the web content based upon the ambient data.

According to some embodiments, the method 200 may include the step 230 of providing the modified web content to the web server which then provides the content to the client device.

Exemplary Use Case One

In many instances, the geolocation of a visitor may be derived from the Internet protocol (IP) address where a web request originates (typically the location of the client device) or directly from the geolocation data provided by a mobile client device 105. In this example, the runtime module 125 may utilize one claim processor 140A that may select the origin IP or position coordinates from the ambient data framework 120 and connect to a third party source that includes weather service data to retrieve current weather conditions. The weather conditions would be added to the ambient data. The web content management application 130A may include the weather data along with additional specific promotions, content, banners, and links that are related to the weather data. The web content management application 130A may include the combined data in the web content (e.g., web page) that is provided to the mobile client device 105.

In an additional example, the web page may include offers such as promotions for family activities generated by the runtime module 125. As such, ambient data indicative of both geolocation and weather data may be utilized to select appropriate family activities that are displayed on the web page. For example, the runtime module 125 may decide whether to gather indoor and/or outdoor family activities proximate the geographical location associated with the visitor.

It will be understood that the runtime module 125 begins the analysis with only one claims processor 140A that located geolocation information such as an IP address or coordinates. Additional claims processors may depend from the claims processor 140A and may add extra ambient data to the database 107. For example, the claims processor 140A that obtains an IP address may initiate a second claims processor 140B that locates the actual coordinates (i.e., longitude and latitude). The second claims processor 140B may initiate a third claims processor 140C that locates weather data.

Finally, the runtime module 125 aggregates the relevant output from the claims processors 140A-C that is utilized by the web content management application 130A to produce web content in the form of a web page that includes relevant links, banners, and the like.

Exemplary Use Case Two

The ambient data framework 120 may be adapted to provide visitor tracking functionalities, which enables the ambient data framework 120 to identify return visitors. For example, return visitors might be identified based upon on explicit login (authentication) information provided by the visitor. In both instances, the identified user identity may be utilized to gather explicit visitor preferences. In some embodiments, these preferences may have been established in a previous session. In these cases, the web content management application 130A might incorporate specific content such as promotions, content, banners, and links based on the explicit preferences or redirect the visitor to another specified landing page.

It will be understood that the runtime module 125 begins the analysis with only one claims processor 140A that obtains visitor identification data. Additional claims processors may depend from the claims processor 140A and may add extra ambient data to the database 107. For example, the claims processor 140A that obtains visitor identification data may initiate a second claims processor 140B that locates the explicit preferences from at least one third party source such as a CRM system. The second claims processor 140B may initiate a third claims processor 140C to obtain marketing products such as banners, links, and the like.

Finally, the runtime module 125 aggregates the relevant output from the claims processors 140A-C that is utilized by the web content management application 130A to produce web content in the form of a web page that includes relevant links, banners, and the like.

Figure 3:
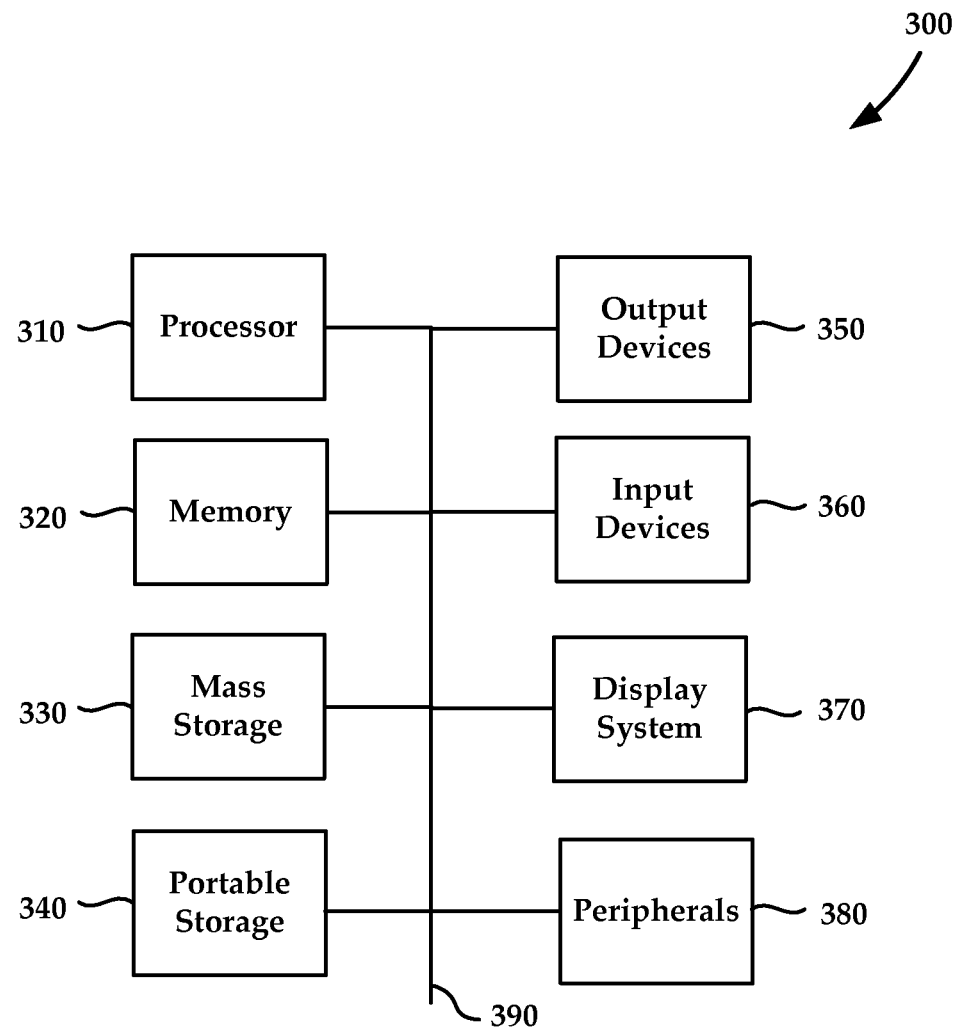
FIG. 3 is a block diagram of an exemplary computing system that may be utilized to practice aspects of the present disclosure.

FIG. 3 illustrates an exemplary computer system 300 that may be used to implement an embodiment of the present invention. The computer system 300 of FIG. 3 includes one or more processors 310 and memory 320. Main memory 320 stores, in part, instructions and data for execution by processor 310. Main memory 320 can store the executable code when the computer system 300 is in operation. The computer system 300 of FIG. 3 may further include a mass storage device 330, portable storage devices 340, output devices 350, user input devices 360, a display system 370, and other peripheral devices 380.

The components shown in FIG. 3 are depicted as being connected via a single bus 390. The components may be connected through one or more data transport means. Processor unit 310 and main memory 320 may be connected via a local microprocessor bus, and the mass storage device 330, peripheral device(s) 380, portable storage device 340, and display system 370 may be connected via one or more input/output (I/O) buses.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 320.

Portable storage device 340 operates in conjunction with a portable non-volatile storage medium, such as a floppy disk, compact disk or Digital video disc, to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alphanumeric keypad, such as a keyboard, for inputting alphanumeric and other information, or a pointing device, such as a mouse, a trackball, stylus, or cursor direction keys. Additionally, the system 300 as shown in FIG. 3 includes output devices 350. Suitable output devices include speakers, printers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. Peripheral device(s) 380 may include a modem or a router.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for managing web content, comprising:
providing web content associable with a web server;
evaluating ambient data received from the web server and ambient data from at least one third party source, wherein the ambient data received from the web server includes one or more web analytics comprising a life-cycle projection that includes a session start, a request start, and a request end;
adapting an ambient data framework to interface with information of interest to a visitor accessing the web content by packaging and deploying a set of claims processors, wherein the claims processors are placed into order using metadata to create output that is provided to one or more claims pipelines, based on dependencies, the claims processors generating output;
storing the output in a database;
selectively modifying content included in the web content based upon the output of the claims processors;
determining a configuration of a mobile visitor device requesting the web content provided by a web browser of the mobile visitor device, wherein the configuration is determined from visitor specific information gathered from the mobile visitor device or the web browser; and
providing the modified web content to the web server.

2. The method according to claim 1, wherein ambient data includes at least one of a visitor name, a visitor identification, an address, a postal code, a telephone number, a credit card number, as Internet protocol address, a media access control (MAC) address, visitation duration, visitation frequency, and combinations thereof.

3. The method according to claim 1, wherein ambient data is gathered from at least one of a cookie, a web form associated with the web content, a query string embedded in a uniform resource locator (URL) associated with the web content, window.name information associated with a web browser session, hyper text transfer protocol authentication information, and combinations thereof.

4. The method according to claim 1, wherein the one or more web analytics are received via the claims processors, the claims processors being communicatively coupled to a claims store adapted to store the one or more web analytics indicative of ambient data.

5. The method according to claim 1, further comprising receiving ambient data into a claims store from the at least one third party source by way of a data exchange adapter.

6. The method according to claim 1, wherein the at least one third party source includes any of a Java Servlet, Web-Services Enabled Application, a Visitor Relationship Management System, a weather data source, a geolocation data source, and combinations thereof.

7. The method according to claim 6, further comprising the claims store receiving ambient data from the at least one third party source via the data exchange adapter, the data exchange adapter being adapted to at least one of:
convert data received from the third party source to an extensible markup language data format utilized by the data store application; and
provide ambient data to the third party source by converting the ambient data from the extensible markup language data format to the data format utilized by the third party source.

8. The method according to claim 1, wherein generating further includes:
determining a configuration of the mobile visitor device requesting the web content; and
providing a compatible version of the marketing campaign to the mobile visitor device.

9. A system for managing web content, comprising:
a memory for storing a web content management application that includes computer-readable instructions that include:
a content manager module adapted to:
maintain a global marketing framework indicative of a marketing campaign; and
generate web content from at least a portion of the global marketing framework via a web server;
an ambient data framework adapted to:
evaluate, via the web server, ambient data included in a request and ambient data from at least one third party source;
interface with information of interest to a visitor accessing the web content;
utilize the information of interest to selectively modify content of the web content, wherein the ambient data received from the web server includes one or more web analytics comprising a life-cycle projection that includes a session start, a request start, and a request end;
store the ambient data in a database; and
selectively modify content included in the web content based upon the ambient data; and
wherein the content manager module is adapted to:
determine a configuration of a mobile visitor device requesting the web content provided by a web browser of the mobile visitor device, wherein the configuration is determined from visitor specific information gathered from the mobile visitor device or the web browser; and
provide a compatible version of the web content having modified content to the mobile visitor device; and a processor adapted to execute the web content management application.

10. The system according to claim 9, wherein ambient data includes at least one of a visitor name, a visitor identification, an address, a postal code, a telephone number, a credit card number, a social networking profile, an Internet protocol address, a media access control (MAC) address, visitation duration, visitation frequency, and combinations thereof.

11. The system according to claim 9, wherein ambient data is gathered from at least one of a cookie, a web form associated with a presentation server hosting the web content, a query string embedded in a uniform resource locator (URL) associated with the presentation server hosting the web content, window name information associated with a web browser session, hyper text transfer protocol authentication information, and combinations thereof.

12. The system according to claim 9, wherein a runtime module is further adapted to initiate a flow of ambient data into a data store utilizing a claims pipeline that includes an ordered listing of claims processors associated with each of the session start, the request start, and the request end of the life-cycle projection.

13. The system according to claim 12, wherein each of the claims processors provides ambient data associated therewith to a claims store according to the ordered listing of claims processors beginning with claims processors associated with the session start, then claims processors associated with the request start, and then claims processors associated with the request end.

14. The system according to claim 12, wherein each of the claims processors includes at least one of:
  a dependent claim processor that receives input from one or more additional claims processors and does not output data;
  an independent claim processor that does not receive input from one or more additional claims processors and does not output data;
  a dependent claim processor that receives input from one or more additional claims processors in a first format and outputs data in one or more additional formats; and
  an independent claims processor that does not receive input from one or more additional claims processors and outputs data in one or more formats.

15. The system according to claim 14, wherein the ambient data framework includes a claim engine adapted to invoke one or more of the claims processors and determine claim processor dependencies.

16. The system according to claim 12, further comprising one or more data exchange adapters configured to interface the claims processors with the at least one third party source.

17. The system according to claim 12, wherein a claims store is associated with a database communicatively coupled to the web server.

18. The system according to claim 9, wherein the at least one third party source includes any of a Java Servlet, Web-Services Enabled Application, a Visitor Relationship Management System, a weather data source, a geolocation data source, and combinations thereof.

19. The system according to claim 9, wherein a data exchange adapter is adapted to at least one of:
  convert data received from the at least one third party source to an extensible markup language data format utilized by the web content management application; and
  provide ambient data to the at least one third party source by converting the ambient data from the extensible markup language data format of the web content management application to a data format utilized by the at least one third party source.

20. The system according to claim 9, wherein generating further includes:
  determining a configuration of the mobile visitor device requesting the web content; and
  providing a compatible version of the marketing campaign to the mobile visitor device.

21. The system according to claim 20, wherein the configuration of the mobile visitor device includes at least one of an operating system version and an international mobile equipment identifier (IMEI).

22. A non-transitory computer readable storage medium having a computer program embodied thereon, the computer program executable by a processor in a computing system to perform a method for managing web content, the method comprising:
  providing web content associable with a web server;
  evaluating ambient data received from the web server and ambient data from at least one third party source, wherein the ambient data received from the web server includes one or more web analytics comprising a life-cycle projection that includes a session start, a request start, and a request end;
  adapting an ambient data framework to interface with information of interest to a visitor accessing the web content by packaging and deploying a set of claims processors, wherein the claims processors are placed into order using metadata to create output that is provided to one or more claims pipelines, based on dependencies, the claims processors generating output;
  storing the output in a database;
  selectively modifying content included in the web content based upon the output of the claims processors;
  determining a configuration of a mobile visitor device requesting the web content provided by a web browser of the mobile visitor device, wherein the configuration is determined from visitor specific information gathered from the mobile visitor device or the web browser; and
  providing the modified web content to the web server.

* * * * *